United States Patent [19]

Emmel, John J.

[11] Patent Number: 4,650,706
[45] Date of Patent: Mar. 17, 1987

[54] TABBED TAPE PAD

[75] Inventor: Emmel, John J., Blaine, Minn.

[73] Assignee: Minnesota Mining and Manufacturing Company, St. Paul, Minn.

[21] Appl. No.: 862,002

[22] Filed: May 12, 1986

[51] Int. Cl.⁴ .............................................. B32B 3/08
[52] U.S. Cl. ...................................... 428/40; 428/77; 428/194; 428/354; 206/484
[58] Field of Search ...................... 428/40, 42, 77, 194, 428/192, 354; 206/484, 813, 820

[56] References Cited

U.S. PATENT DOCUMENTS 3,373,457 3/1968 Rouch ............................. D4/137 X
4,558,888 12/1985 Hanson et al. .................. 428/352 X

FOREIGN PATENT DOCUMENTS 1340636 12/1973 United Kingdom .................. 428/40

Primary Examiner—Alexander S. Thomas
Attorney, Agent, or Firm—Donald M. Sell; James A. Smith; John C. Barnes

[57] ABSTRACT

A pad of tape strips of pressure sensitive tape is provided with a tape tab on each tape strip which is progressively shorter along the tape strips from the uppermost tape strip in the pad to the bottom tape strip to facilitate separation of the tape strips without separating more than one tape strip at a time.

3 Claims, 4 Drawing Figures

TABBED TAPE PAD

BACKGROUND OF THE INVENTION

1. Field of the Invention

This invention relates to a stack of tape strips positioned one upon the other to form a pad with each strip in the pad having a tab at one end, and in one aspect to a pad where the tabs are of decreasing length relative to the length of the tape strip from the top of the pad to the last strip in the pad.

2. Description of the Prior Art

Pads of tape strips are well known in the art and placing the removable tab at one end of the strip of tape in the pad or stack affording separation of the strips in the pad are well known. One such patent showing a pad of adhesive coated strips is U.S. Pat. No. 3,373,457 wherein each adhesive sheet 38 in a stack 36 has a short non-adhesive end portion 44 on the adhesive side of each sheet to facilitate the user grasping the uppermost sheet 38 when separating it from the stack. Similarly, stacks of adhesive strips such as shown in U.S. Pat. No. 4,558,888 are known where each end of each strip in the pad is provided with the removable tab adhered to the end of the strip by the adhesive of the strip. These tabs facilitate removal of one strip from another in the stack.

It has been discovered however, that when removing a strip of tape from the pad by lifting on the tab to separate the strip, an equal force is applied to the next adjacent strip and there is a tendency to separate more than one strip from the stack. This is particularly true if the person separating the strips does not place his finger on the tab below the strip being separated to hold it in place.

Overcoming this problem is possible by beginning the separating or lifting to peel the top strip from the next adjacent strip at a position within the area the adjacent strip is adhered to the third strip in the stack.

The discovery of the present invention of having the tabs in the stack progressively overlap the next lower tab thus spaces the initial peeling force at a position away from the tab of the adjacent strip each time a tape strip is removed.

SUMMARY OF THE INVENTION

This invention is directed to a pad of tape strips having tabs, and the like wherein the tabs in the pad are regressive to provide longer tabs at the top of the pad than at the bottom of the pad to provide a minimum amount of overlap of the uppermost tabs to permit removal of the tape strips successively without separation of more than one tape strip.

The pad of the present invention comprises a multiplicity of tape strips placed in a pad with each strip comprising a backing having one open surface coated with a layer of pressure sensitive adhesive. Each tape strip is provided with a tab at one end which is applied to the strip by the adhesive. The tabs extend to the one end of the tape strips. The tabs extend from the end of the tape strips progressively greater distances along the length of this tape strip from the one end from the bottom strip of the pad to the strip at the top of the pad affording a regressive tab getting smaller from the top of the pad to the bottom. The tabs may be folded providing an additional tab for removing the tab secured to each strip of tape. The folded regressive tabs may be produced from the same length of material to afford the regressive feature by changing the size of the free end of the tab.

DESCRIPTION OF THE DRAWING

The present invention will be described in greater detail with reference to the accompanying drawing wherein.

DESCRIPTION OF THE PREFERRED EMBODIMENT

Figure 1:
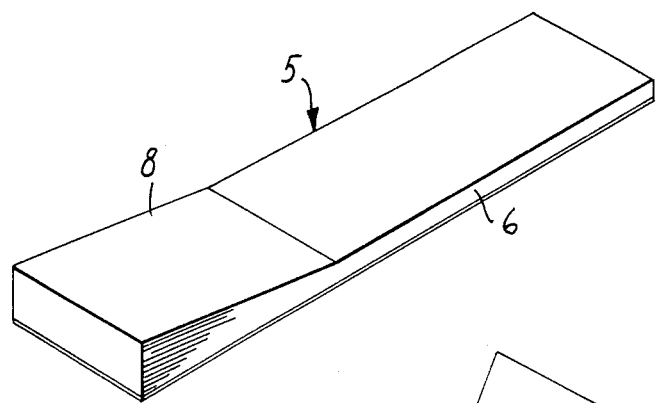
FIG. 1 is a perspective view of a pad of tape strips.

The present invention relates to an improvement in a pad 5 of tape strips 6 with each tape strip being provided with a tab at one end to facilitate the separation of the strips of tape in the pad.

As illustrated in the drawing, the pad 5 of the tape strips 6 comprises a plurality of tape strips of equal length and width, each comprising a backing 8 coated on one surface with a layer of pressure sensitive adhesive 10 and positioned in a pad with one strip positioned on top of the next strip. In the illustrated embodiment the ends of the tape strips are also positioned in vertical alignment but they could be positioned in shingled relationship with respect to one another with the tape strips offset progressively upward from the bottom strip to the top strip in a direction toward the end bearing tabs 15.

Figure 2:
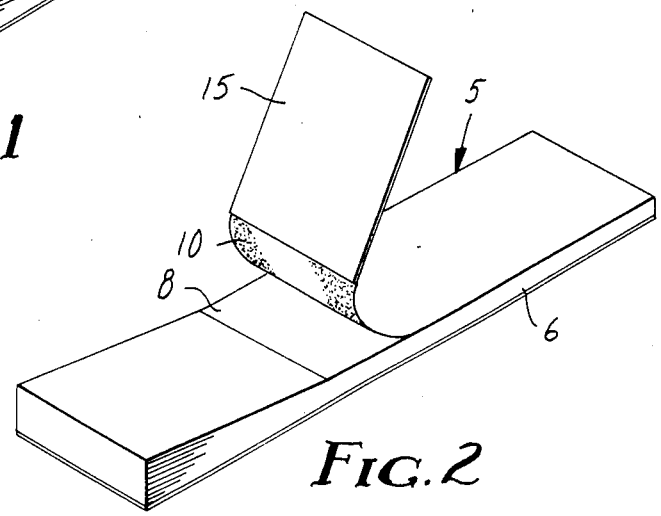
FIG. 2 is a perspective view illustrating the separation of one tape strip from the pad.

The tape tabs 15 are adhered to the adhesive coated surface of the tape strips 6 and have a progressively greater length from one end 11 of the tape strips from the bottom strip 6 of the tape strips to the top strip 6. The overlap of the tabs 15 from the bottom tab to the top tab functions to move the point at which the peeling of the strips from one another will begin beyond the end of the tab of the next lower strip of tape to a point such that a peeling force is not applied to the adhesive coated end of the lower strip. Peeling will begin at an area of the second strip where is it adhered to the third strip. The overlap of the tab and the peeling of one strip from the next strip is illustrated in FIG. 2.

Figure 3:
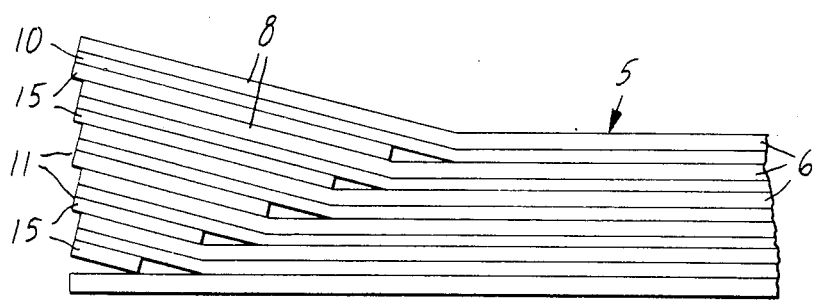
FIG. 3 is an enlarged detail side view of the pad of tape strips adjacent the tabbed end of the tape strips.

FIG. 3 illustrate with greater precision the ends 11 of the strips of tape and the progressively greater length of the tabs 15 on the tape strips 6 from one end of the pad.

Figure 4:
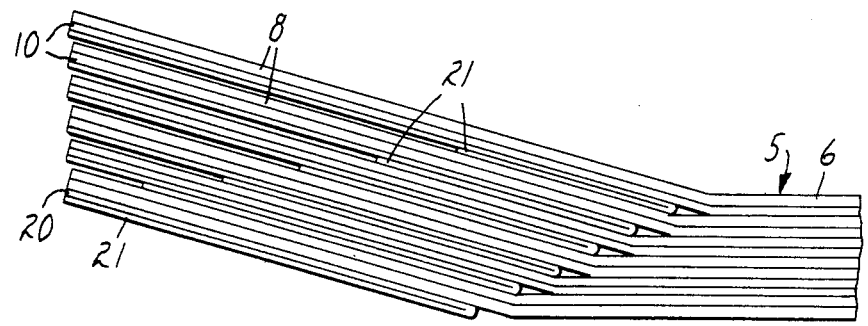
FIG. 4 is an enlarged detail view of the pad of tape strips with the regressive tab and folded tabs.

FIG. 4 illustrates the increasing length of the folded tabs 20 from the bottom tape strip toward the top tape strip wherein the tabs 20 are substantially all of the same length and one end of each tab is folded back upon itself to provide a removable tab end 21 which is free from the adhesive 10. This tab end 21 has a progressively shorter length from the bottom tape strip to the top tape strip but nonetheless affords facile removal of the tab to apply the full length of the tape strip to a receptor surface.

An example of a pad constructed in accordance with the present invention is a pad formed of tape strips with the tape corresponding to pressure sensitive adhesive tape available from Minnesota Mining and Manufacturing Company and identified as No. 810 "Magic" Transparent Tape with each tape strip having a tab formed of paper coated with a release coating to permit easy separation of the same from the adhesive on the tape strip. In testing the length of overlap, the pads were layed up with the tape tabs overlapping one another by 1/32 of an inch, 1/64 of an inch and 1/128 of an inch. This provided a test of the overlap necessary to restrict the amount of multiple lifting of strips from the pad. Each sample tested worked reliably. If there is not overlap, the lifting of the adjacent strip was unpredictable.

Thus, the range of accuracy in manufacturing pads may differ and 1/128th of an inch may be beyond the accuracy of presently known converting methods for making the pads, and it is believed that an overlap of 1/8 to 1/50 of an inch is a preferred range. Samples of regressive folded tabs, as illustrated in FIG. 4, were made using 0.06 millimeter paper and 0.05 millimeter polyethylene and 0.127 millimeter polyester with Minnesota Mining and Manufacturing Company No. 811 Removable Transparent Tape. The tabs formed of these materials all performed satisfactorily when formed with a progressive overlap.

As recited herein tabs, and the like, include tape strips with adhesive free ends, low adhesion areas at an end, tape strips with a pressure-sensitive adhesive coating on one side and differential low-adhesion coatings on the opposite side to afford low adhesion at one end of each successive strip, folded tape ends, removable liner portions, a strip of paper or polymeric material or detackified adhesive areas, etc. The tabs can be removable by having the boundary between the tab and the adhesive coated tape area being perforated across the width of the tape or the paper or polymeric material having a release coating to make the same readily separable from the tape adhesive.

Having thus described the invention with references to the drawing and several specific embodiments it is understood that changes in the tape materials, tab materials, and sizes of pads may be made without departing from the spirit and scope of the present invention.

I claim:

1. A pad of tape strips each strip comprising a backing and a coating of pressure sensitive adhesive formed with the tape strips positioned one on top of the other, the improvement comprising a tape tab formed at one end of each tape strip with the length of the tab extending from said end toward the opposite end being progressively greater from one side of the pad to the other such that separation of the tape strip with the longest tape tab may be accomplished by grasping the tape tab and peeling the strip from the pad without separation of the next adjacent tape strip.

2. A pad of tape strips according to claim 1 wherein the tape tabs overlay the adjacent tape tab by at least 0.007 inch.

3. A pad of tape strips according to claim 1 wherein the tabs have a folded end spaced from said one end of each tape strip where the folded ends have a progressively greater length from the top strip in a pad to the bottom strip in a pad.

* * * * *